US006208621B1

(12) United States Patent
Ducaroir et al.

(10) Patent No.: US 6,208,621 B1
(45) Date of Patent: Mar. 27, 2001

(54) APPARATUS AND METHOD FOR TESTING THE ABILITY OF A PAIR OF SERIAL DATA TRANSCEIVERS TO TRANSMIT SERIAL DATA AT ONE FREQUENCY AND TO RECEIVE SERIAL DATA AT ANOTHER FREQUENCY

(75) Inventors: Francois Ducaroir, Santa Clara; Karl S. Nakamura, Palo Alto; Michael O. Jenkins, San Jose, all of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/991,906

(22) Filed: Dec. 16, 1997

(51) Int. Cl.⁷ .................................................. H04L 12/26
(52) U.S. Cl. .......................................... 370/241; 370/528
(58) Field of Search ..................... 370/241–252, 370/366, 496, 532, 507, 528, 522, 537; 375/356; 327/407

(56) References Cited

U.S. PATENT DOCUMENTS

| | | | |
|---|---|---|---|
| 4,048,445 | 9/1977 | Ghisler | 370/248 |
| 4,308,472 | 12/1981 | McLaughlin | 327/18 |
| 4,402,075 | 8/1983 | Bargeton et al. | 370/246 |
| 4,419,633 | 12/1983 | Phillips | 331/17 |
| 4,529,979 | 7/1985 | Kusama et al. | 370/249 |
| 4,564,933 | 1/1986 | Hirst | 714/713 |
| 4,573,017 | 2/1986 | Levine | 327/114 |
| 4,575,841 | 3/1986 | Fagerstedt et al. | 370/248 |
| 4,575,864 | 3/1986 | Rice, Jr. et al. | 375/368 |
| 4,613,979 | 9/1986 | Kent | 375/357 |
| 4,633,464 | * 12/1986 | Anderson | 370/528 |
| 4,751,469 | 6/1988 | Nakagawa et al. | 327/7 |
| 4,794,596 | * 12/1988 | Gloyne et al. | 370/241 |
| 4,806,878 | 2/1989 | Cowley | 331/1 A |
| 4,988,901 | 1/1991 | Kamuro et al. | 327/18 |
| 5,028,813 | 7/1991 | Hauck et al. | 370/20 |
| 5,043,976 | 8/1991 | Abiven et al. | 359/110 |
| 5,088,112 | 2/1992 | Pyhalammi et al. | 375/257 |
| 5,126,690 | 6/1992 | Bui et al. | 331/1 A |
| 5,159,279 | 10/1992 | Shenoi et al. | 327/2 |
| 5,180,993 | 1/1993 | Dent | 331/16 |
| 5,200,979 | 4/1993 | Harris | 375/292 |

(List continued on next page.)

Primary Examiner—Chau Nguyen
Assistant Examiner—D Trinh

(57) ABSTRACT

An apparatus and method are presented for testing the ability of a pair of serial data transceivers to transmit serial data at one frequency and to receive serial data at another frequency. A serial communication device of the present invention includes a first and second serial data transceivers and a multiplexer formed upon a monolithic semiconductor substrate. Each serial data transceiver includes a receiver and a transmitter which transmits serial data in response to a clock signal. The second serial data transceiver is coupled to receive a reference clock signal. The multiplexer facilitates testing, and is coupled to the first serial data transceiver. The multiplexer receives the reference clock signal, a test clock signal, and a test signal, and provides either the reference clock signal or the test clock signal to the first transceiver dependent upon the test signal. The reference and test clock signals have different frequencies. The multiplexer provides the reference clock signal to the first transceiver when the test signal is deasserted, and provides the test clock signal to the first transceiver when the test signal is asserted. During testing, the output of the transmitter of one transceiver is coupled to the input of the receiver of the other transceiver, and the test signal is asserted. Each receiver produces parallel output test data. A match between the two sets of parallel output test data and the parallel input test data demonstrates the abilities of both transceivers to transmit and receive serial data at different frequencies.

7 Claims, 1 Drawing Sheet

U.S. PATENT DOCUMENTS

| | | | |
|---|---|---|---|
| 5,251,217 | 10/1993 | Travers et al. | 370/538 |
| 5,268,652 | 12/1993 | Lafon | 331/1 A |
| 5,274,668 | 12/1993 | Marschall | 375/224 |
| 5,301,207 | 4/1994 | Emerson et al. | 375/224 |
| 5,327,103 | 7/1994 | Baron et al. | 331/1 A |
| 5,343,461 | 8/1994 | Barton et al. | 370/249 |
| 5,379,409 | 1/1995 | Ishikawa | 714/37 |
| 5,398,270 | 3/1995 | Cho et al. | 377/39 |
| 5,550,802 | 8/1996 | Worsley et al. | 370/252 |
| 5,559,854 | 9/1996 | Suzuki | 379/27 |
| 5,638,518 | 6/1997 | Malladi | 709/251 |
| 5,644,577 * | 7/1997 | Christensen et al. | 370/528 |
| 5,787,114 | 7/1998 | Ramamurthy et al. | 375/221 |
| 5,790,563 | 8/1998 | Ramamurthy et al. | 714/736 |
| 5,956,370 | 9/1999 | Ducarior et al. | 375/221 |

* cited by examiner

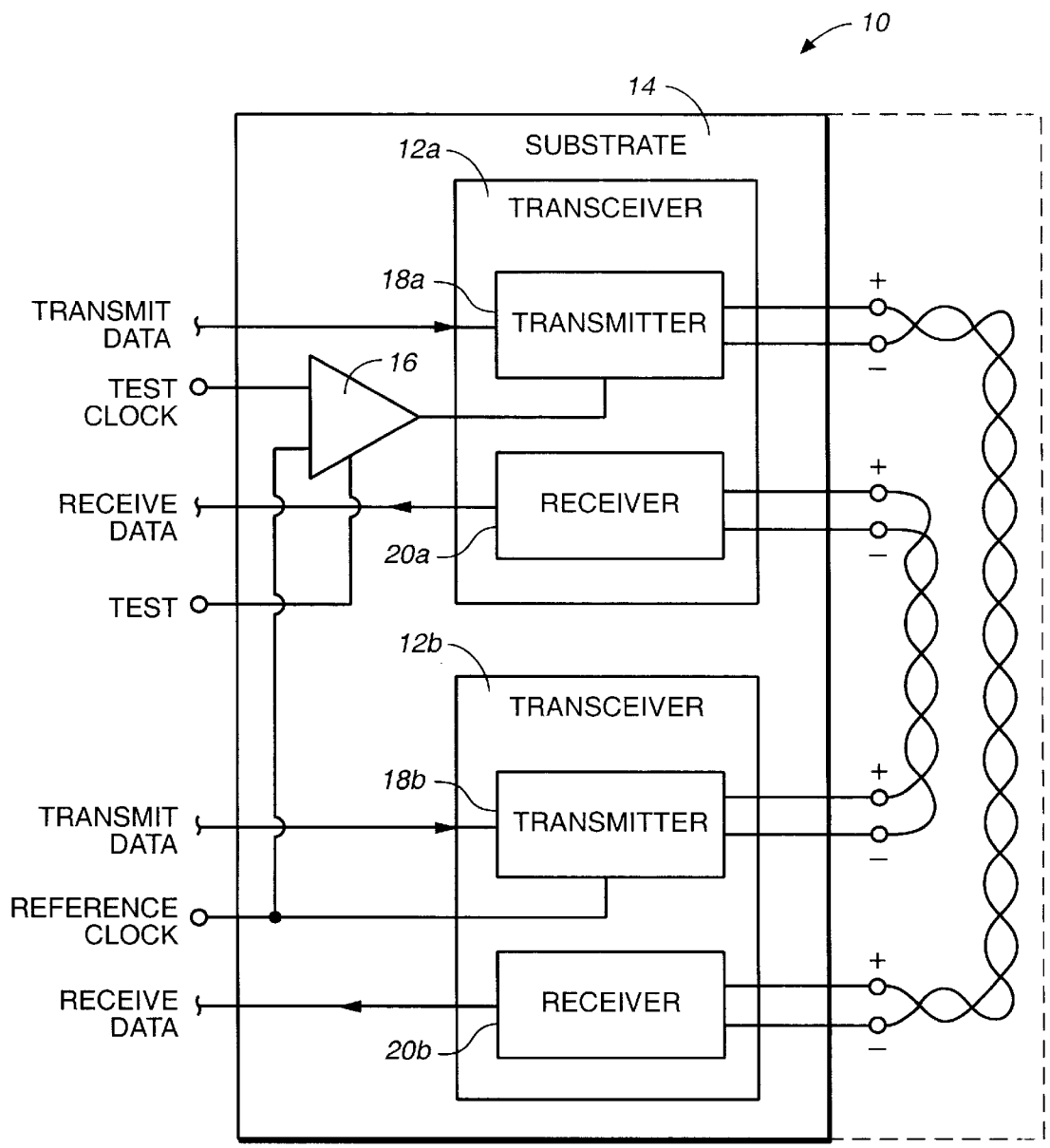
FIG._1

6,208,621 B1

APPARATUS AND METHOD FOR TESTING THE ABILITY OF A PAIR OF SERIAL DATA TRANSCEIVERS TO TRANSMIT SERIAL DATA AT ONE FREQUENCY AND TO RECEIVE SERIAL DATA AT ANOTHER FREQUENCY

BACKGROUND OF THE INVENTION

1. Field of the Invention

This invention relates to digital data communication circuits, and more particularly to the operational verification of serial data communication circuits.

2. Description of the Relevant Art

Electronic devices typically communicate via electrical signals (e.g., voltage and/or current) driven upon electrical conductors (e.g., metal wires). Simultaneous transmission of multiple signals is accommodated by several wires routed in parallel (i.e., buses). Most computer systems have a modular architecture centered around a bus which serves as a shared communication link between system components. The two major advantages of shared buses over direct communication links between system components are versatility and low cost. By defining a standard interconnection scheme for a given bus, new devices may be easily connected to the bus. The cost of the bus is low because it is shared among the number of components connected to the bus.

Due to technological advances, the signal processing capabilities of more modern electronic devices (e.g., microprocessors) are outstripping the signal transfer capabilities of conventional parallel buses. To their detriment, parallel buses have physical limitations which place an upper limit on the rate at which information can be transferred over the bus. For example, the electrical characteristics and loading of each wire of a bus may vary, causing signals transmitted simultaneously upon the bus to be received at different times. Bus timing must take into consideration worst case delays, resulting in reduced data transfer rates of systems employing parallel buses.

A serial data path, on the other hand, is a direct communication link between a single transmitter and a single receiver. Such a serial data path typically includes a transmission medium connected between the transmitter and receiver. The transmission medium may be, for example, a differentially-driven pair of wires or a fiber-optic cable. In cases where the transmission medium is a pair of wires, the communication link (i.e., channel) has a defined electrical loading and is typically optimized for minimum signal delay. As a result, the rate at which electrical signals can be transferred over such a serial data path exceeds the data transfer rate of a common shared parallel bus.

Serial data transmitter/receiver devices (i.e., transceivers) typically include a transmitter which transmits serial data and a receiver which receives serial data. The transmitter typically receives an external clocking signal used to synchronize the generation of a serial data stream. The serial data stream contains enough information to recover the external clocking signal. The receiver typically recovers the clocking signal used to transmit the serial data from the serial data stream, and uses the clocking signal to recover the data from the serial data stream. Thus the receiver is synchronous to the clocking signal inherent within the incoming serial data stream and not to the external clocking signal received by the transmitter.

Serial data transceivers offering digital signal transmission rates exceeding 1 gigabit per second are now commercially available. The testing of such transceivers at their normal operating speeds, however, presents many technical challenges. For example, consider two serial data links between transceivers of two different devices: a first serial data link between a transmitter of a first device and a receiver of a second device, and a second serial data link between a transmitter of the second device and a receiver of the first device. Each device receives a different clocking signal used to transmit serial data. Since no two clocking signals produced by two different sources have exactly the same frequency, each transceiver must be able to transmit serial data at one frequency and receive serial data at another (slightly different) frequency.

Now consider an integrated communications circuit including two or more serial data transceivers. The ability of each transceiver to transmit data at one frequency and receive data at another (slightly different) frequency must be tested and verified. A straightforward testing approach would involve individual testing of each transceiver. A test apparatus including a comparable serial data transceiver would be required, and the time required to test the integrated communications circuit would be proportional to the number of serial data transceivers of the integrated communications circuit.

It would be beneficial to have a testing apparatus which reduces the time and costs associated with the testing of an integrated communications circuit having multiple serial data transceivers. It would also be advantageous to incorporate as much of the testing apparatus as possible within the integrated communications circuit during manufacture in order to facilitate subsequent testing.

SUMMARY OF THE INVENTION

The problems outlined above are in large part solved by an apparatus and method for testing the ability of a pair of serial data transceivers to transmit serial data at one frequency and to receive serial data at another frequency. A serial communication device of the present invention includes a first and second serial data transceivers and a multiplexer formed upon a monolithic semiconductor substrate. Each serial data transceiver transmits and receives serial data in response to a clock signal. The second serial data transceiver is coupled to receive a reference clock signal. The multiplexer facilitates testing, and is coupled to the first serial data transceiver. The multiplexer receives the reference clock signal, a test clock signal, and a test signal, and provides either the reference clock signal or the test clock signal to the first serial data transceiver dependent upon the test signal. The reference clock signal and the test clock signal have different frequencies. The multiplexer provides the reference clock signal to the first serial data transceiver when the test signal is deasserted (i.e., during normal operation), and provides the test clock signal to the first serial data transceiver when the test signal is asserted (i.e., during testing).

Each serial data transceiver includes a transmitter and a receiver. The transmitter receives parallel data, converts the parallel data to a serial data stream, and transmits the serial data stream in response to a first clock signal. The receiver receives a serial data stream, samples the serial data stream in order to recover the data, and converts the sampled serial data to parallel data in response to in response to a second clock signal recovered from the serial data stream. When the test signal is deasserted, the first clock signal of both transceivers is the reference clock signal. When the test signal is asserted, the first clock signal of the second transceiver is the reference clock signal, and the first clock signal of the first transceiver is the test clock signal.

The present method for testing the ability of a transmitter and a receiver of a pair of serial data transceiver to operate at different frequencies includes providing the serial data communication device described above. Each transmitter includes a transmit data input port, a serial data output port, and a clock terminal for receiving the clock signal. s Each receiver includes a serial data input port and a receive data output port. The serial data output port of the transmitter of the first serial data transceiver is coupled to the serial data input port of the receiver of the second transceiver. The serial data output port of the transmitter of the second transceiver is coupled to the serial data input port of the receiver of the first transceiver. Testing is initiated by asserting the test signal, causing the transceivers to transmit and receive serial data at different frequencies. Input test data is provided to the transmit data input ports of the transmitters of both transceivers. Parallel output test data is received from the receivers of both transceivers and compared to the parallel input test data. A match between the parallel output test data and the parallel input test data demonstrates the ability of the corresponding transceiver to transmit and receive serial data at different frequencies.

BRIEF DESCRIPTION OF THE DRAWINGS

Other objects and advantages of the invention will become apparent upon reading the following detailed description and upon reference to the accompanying drawings in which:

FIG. 1 is a block diagram of one embodiment of an integrated serial communication device of the present invention, wherein the serial communication device includes a pair of transceivers and a multiplexer formed upon a single monolithic semiconductor substrate, and wherein the transceivers transmit serial data in response to a first clock signal and receive serial data in response to a second clock signal recovered from an input serial data stream, and wherein the multiplexer facilitates testing to verify the ability of each transceiver to transmit serial data at one frequency and to receive serial data at another frequency.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring now to the drawings, FIG. 1 is a block diagram of one embodiment of an integrated serial communication device 10 including a pair of transceivers 12a–b formed upon a single monolithic semiconductor substrate 14. Transceiver 12a includes a transmitter 18a and a receiver 20a. Transceiver 12b includes a transmitter 18b and a receiver 20b. Transceivers 12a–b transmit serial data in response to a first clock signal and receive serial data in response to a second clock signal recovered from an input serial data stream. Serial communication device 10 also includes a multiplexer 16 coupled to transceiver 12a. Multiplexer 16 facilitates testing to verify the abilities of transceivers 12a–b to transmit serial data at one frequency and to receive serial data at another frequency. Multiplexer 16 selects between the 'reference clock' signal and a 'test clock' signal according to the value of a 'test' signal. The test clock signal has a frequency which differs from the frequency of the reference clock signal. During normal operation of serial communication device 10, the test signal is deasserted, and the operations of transmitters 18a–b are synchronized by the reference clock signal. During testing, the output of transmitter 18a is coupled to the input of receiver 20b, the output of transmitter 18b is coupled to the input of receiver 20a, and the test signal is asserted. The operations of transmitter 18b are synchronized by the reference clock signal, and the operations of transmitter 18a are synchronized by the test clock signal. The recovered clock signals which synchronize the operations of receivers 20a–b differ from the clock signals applied to respective corresponding transmitters 18a–b. As a result, each transceiver 12 transmits serial data at one frequency and receives serial data at a different frequency.

The test clock signal is preferably generated by a different source than the reference clock signal. As no two clock signals produced by two different sources have exactly identical frequencies, the frequencies of the reference clock and test clock signals are different. To function for testing purposes as intended, the reference clock and test clock signals differ by a fraction of their nominal values. For example, the reference clock and test clock signals may differ by ±100 parts per million (ppm), the equivalent of ±0.01 percent.

Each transmitter 18 receives parallel data at a 'transmit data' input port, converts the parallel data to serial data (i.e., serializes the parallel data), and transmits the serial data differentially as a serial data stream between a pair of polarized transmitter output terminals (i.e., at a serial data output port). The operations of each transmitter 18 are synchronized by the transitions at active "edges" of either the reference clock or the test clock signal dependent upon which clock signal is provided to the transmitter. Each receiver 20 receives a serial data stream from between a pair of polarized receiver input terminals (i.e., at a serial data input port) and recovers a clock signal used to transmit the serial data from the serial data stream. Each receiver 20 uses the recovered transmit clock signal to sample the serial data stream in order to extract the data from the serial data stream, to align the extracted data into parallel units, and to provide the resulting parallel data at the corresponding 'receive data' output port.

Serial communication device 10 also includes a reference clock signal terminal, a test clock signal terminal, and a test signal terminal. The reference clock signal is one of two input signals to multiplexer 16, and is also provided to transceiver 12b. The test clock signal is the other input signal to multiplexer 16. Multiplexer 16 provides either the reference clock signal or the test clock signal to transmitter 18a of transceiver 12a dependent upon the value of the test signal. During normal operation of serial communication device 10, the test signal is deasserted, and multiplexer 16 provides the reference clock signal to transmitter 18a. Thus during normal operation, transmitters 18a–b of respective transceivers 12a–b receive the reference clock signal.

In order to test the ability of each transceiver 12 to transmit serial data at one frequency and to receive serial data at a (slightly) different frequency, the polarized transmitter output terminals of transmitter 18a are connected to the corresponding polarized receiver input terminals of receiver 20b, and the polarized transmitter output terminals of transmitter 18b are connected to the corresponding polarized receiver input terminals of receiver 20a. The test signal is then asserted, causing multiplexer 16 to provide the test clock signal to transmitter 18a of transceiver 12a. Parallel input test data is provided to the transmit data input ports of transmitters 18a–b. Both transmitters 18a–b serialize the parallel test data, forming separate streams of serial test data. Transmitter 18a transmits the corresponding serial test data stream in response to the test clock signal, while transmitter 18b transmits the corresponding serial test data stream in response to the reference clock signal. Receiver 20b of transceiver 12b receives the serial test data stream produced by transmitter 18a, recovers the test clock signal from the serial test data stream, and uses the test clock signal to sample the serial test data stream. Receiver 20b deserializes the sampled serial test data in response to the recovered test clock signal, and provides the parallel test data at the corresponding receive data output port. Receiver 20a of transceiver 12a receives the serial test data stream produced by transmitter 18b, recovers the reference clock signal from the serial test data stream, and samples the serial test data stream using the recovered reference clock signal. Receiver 20a deserializes the serial test data and provides the resulting parallel output test data at the receive data output port in response to the recovered reference clock signal.

It is noted that the connections between the polarized transmitter output terminals of transmitter 18a and the corresponding polarized receiver input terminals of receiver 20b, as well as the connections between the polarized transmitter output terminals of transmitter 18b and the corresponding polarized receiver input terminals of receiver 20a, may be formed entirely upon monolithic substrate 14 (i.e., on chip) or external to substrate 14 by connecting wires between corresponding terminals formed upon substrate 14. In FIG. 1, the formations of the connections on chip is illustrated by substrate 14 extending to include programmably coupled conductor pairs as indicated by the dashed line.

Following the providing of the parallel input test data to transmitter 18a and the receiving of a first set of parallel output data from receivers 20a and a second set of parallel output data from receivers 20b, each set of parallel output test data is compared to the parallel input test data. A match between the first and second sets of parallel output test data and the parallel input test data (i.e., a one-to-one correspondence between the logic levels of the bit positions of the first and second sets of parallel output data and the parallel input data) demonstrates the abilities of the both transceivers 12a–b to transmit serial data at one frequency and to receive serial data at a different frequency. That is, when the first and second sets of parallel output test data are the same as the parallel input test data, aside from being delayed slightly in time from the parallel input test data, a match occurs, and abilities of the both transceivers 12a–b to transmit serial data at one frequency and to receive serial data at a different frequency are confirmed.

It will be appreciated to those skilled in the art having the benefit of this disclosure that this invention is believed to be an apparatus and method for testing the ability of a pair of serial data transceivers to transmit serial data at one frequency and to receive serial data at another frequency. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A serial communication device formed upon a monolithic semiconductor substrate, comprising:
    a first serial data transceiver and a second serial data transceiver, wherein the second serial data transceiver is adapted to receive a reference clock signal; and
    a multiplexer coupled to the first serial data transceiver, wherein the multiplexer receives the reference clock signal, a test signal, and a test clock signal of dissimilar frequency than the reference clock signal, wherein said multiplexer is configured to provide, during a test time period, the test clock signal to the first serial data transceiver depending on the status of the test signal;
    wherein said multiplexer is configured to provide, during a time period dissimilar from the test time period, the reference clock signal to the second serial data transceiver.

2. A serial communication device formed upon a monolithic semiconductor substrate, comprising:
    a first serial data transceiver and a second serial data transceiver, wherein the second serial data transceiver is adapted to receive a reference clock signal; and
    a multiplexer coupled to the first serial data transceiver, wherein the multiplexer receives the reference clock signal, a test signal, and a test clock signal of dissimilar frequency than the reference clock signal, wherein said multiplexer is configured to provide, during a test time period, the test clock signal to the first serial data transceiver depending on the status of the test signal;
    wherein the multiplexer provides the reference clock signal when the test signal is deasserted, and wherein the multiplexer provides the test clock signal when the test signal is asserted.

3. A serial communication device formed upon a monolithic semiconductor substrate, comprising:
    a first serial data transceiver and a second serial data transceiver, wherein the second serial data transceiver is adapted to receive a reference clock signal; and
    a multiplexer coupled to the first serial data transceiver, wherein the multiplexer receives the reference clock signal, a test signal, and a test clock signal of dissimilar frequency than the reference clock signal, wherein said multiplexer is configured to provide, during a test time period, the test clock signal to the first serial data transceiver depending on the status of the test signal;
    wherein each of the first and second serial data transceivers comprises a transmitter and a receiver, and wherein:
        the transmitter receives parallel data, converts the parallel data to a serial data steram, and transmits the serial data stream in response to a first clock signal; and
        the receiver receives a serial data stream, samples the serial data stream in response to a second clock signal recovered from the serial data stream, and converts the sampled serial data to parallel data in response to the first clock signal.

4. The serial communication device as recited in claim 3, wherein when the test signal is deasserted the first clock signal of each of the first and second serial transceivers is the reference clock signal, and wherein when the test signal is asserted, the first clock signal of said first serial transceivers is the reference clock signal, and the first clock signal of the second serial transceivers is the test clock signal.

5. A method for testing the ability of a transmitter and a receiver of a serial data transceiver to operate at different frequencies, comprising:

providing a serial data communication device, comprising:
- a first and second serial data transceiver, each comprising:
  - a transmitter for transmitting serial data in response to a clock signal, wherein the transmitter comprises an input port, an output port, and a clock terminal for receiving the clock signal; and
  - a receiver for receiving serial data in response to a clock signal, wherein the receiver comprises an input port, an output port, and a clock terminal for receiving the clock signal;
- wherein the second serial data transceiver is coupled to receive a reference clock signal; and
- a multiplexer coupled to the first serial transceiver, wherein the multiplexer is coupled to receive the reference clock signal, a test clock signal, and a test signal, and wherein the multiplexer is configured to provide the reference clock signal to the second transceiver when the test clock signal is deasserted, and wherein the multiplexer is configured to provide the test clock signal to the second transceiver when the test signal is asserted;

coupling the output port of the transmitter of the first transceiver to the input port of the receiver of the second transceiver;

coupling the output port of the transmitter of the second transceiver to the input port of the receiver of the first transceiver; and asserting the test signal.

6. The method as recited in claim 5, further comprising:

providing input test data to the input ports of the transmitters of the first and second transceivers;

receiving a first set of output test data from the output port of the receiver of the first transceiver; and receiving a second set of output test data from the output port of the receiver of the second transceiver; and comparing the first and second sets of output test data to the input test data.

7. A method for testing a pair of transceivers clocked at dissimilar rates, comprising:

providing upon a monolithic substrate a first transceiver and a second transceiver, wherein said first transceiver comprises a first transmitter and a first receiver, and wherein said second transceiver comprises a second transmitter and a second receiver;

serial transmitting a test input signal comprising a sequence of bits transmitted at a first transition rate from the first transmitter to the second receiver;

parallel transmitting a first test output signal comprising a sequence of bits produced by the second receiver; and serial transmitting the test input signal transmitted at a second transition rate from the second transmitter to the first receiver;

parallel transmitting a second test output signal comprising a sequence of bits produced by the first receiver; and testing the pair of transceivers when strobed at dissimilar first and second transition rates by comparing the sequence of bits within the first and second test output signals to the sequence of bits within the test input signal.

* * * * *